Patented Sept. 26, 1939

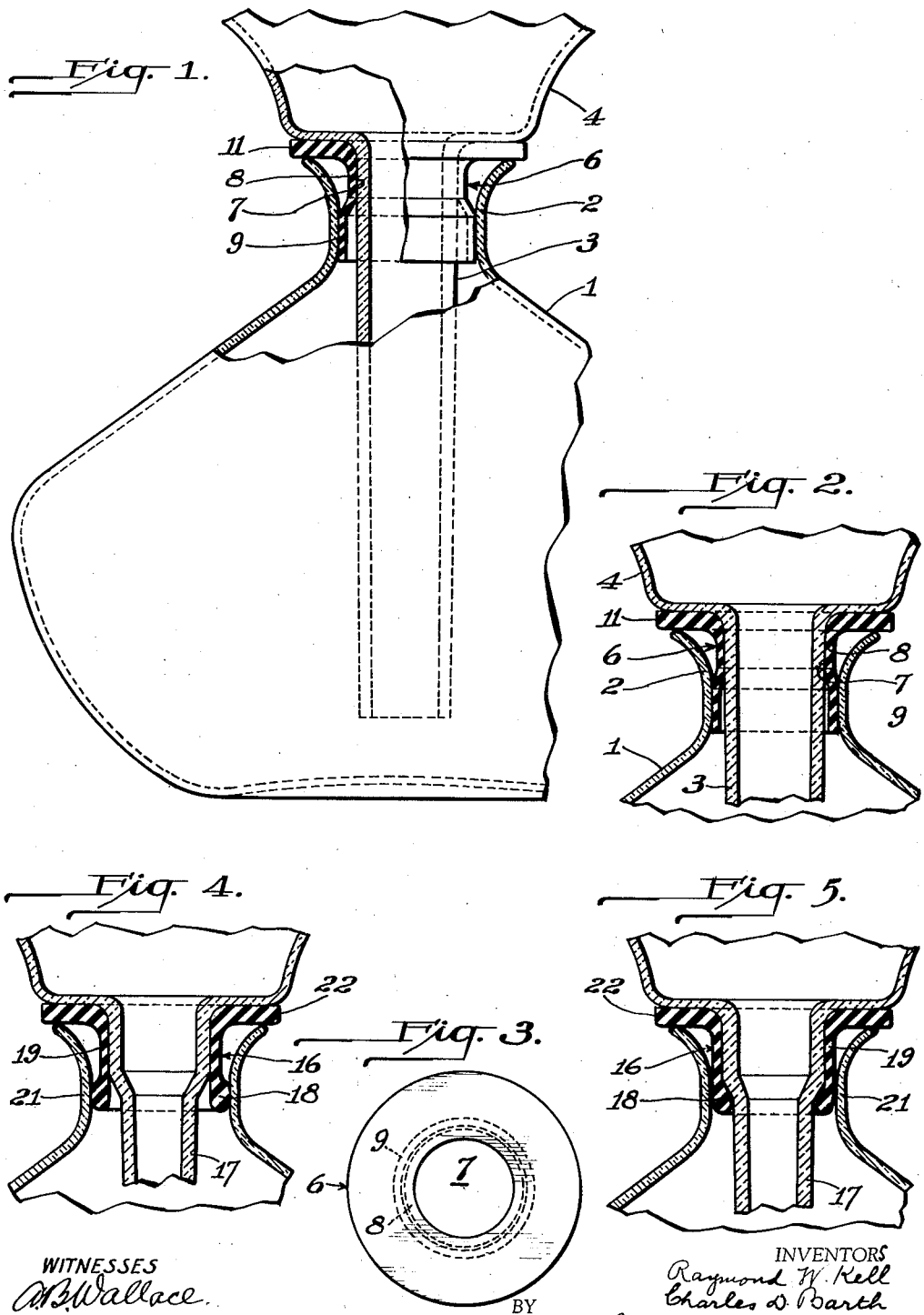

2,174,466

UNITED STATES PATENT OFFICE 2,174,466

COFFEE-MAKER SEAL

Raymond W. Kell and Charles D. Barth, Charleroi, Pa., assignors, by mesne assignments, to Corning Glass Works, Corning, N. Y., a corporation of New York Application September 9, 1936, Serial No. 99,953

6 Claims. (Cl. 53—3)

This invention relates to coffee makers, and more particularly to seals for glass coffee makers of the vacuum type.

Glass coffee makers of the vacuum type comprise a bowl having a neck down through which the stem of an upper bowl or funnel extends to a point adjacent the bottom of the lower bowl. Mounted on the portion of the stem within the neck is a resilient seal that engages the neck and seals the space between it and the stem so that when water in the lower bowl is heated pressure can be created therein which forces the water up through the stem and into coffee in the funnel. As soon as the water level in the lower bowl recedes far enough to expose the lower end of the stem, water ceases to rise in the stem. For best results with these coffee makers the funnel stem should be spaced about one-half inch from the bottom of the lower bowl. If this spacing is decreased materially, too much water is forced up through the stem and the bowl is apt to be overheated and cracked, while if the spacing is too great, insufficient water rises into the bowl to make the coffee strong enough. Heretofore, due to unavoidable variations in the inside diameter of bowl necks, the lower ends of the funnel stems have been spaced various distances from the bottoms of different bowls because the seals could not be inserted so far in small necks as in larger ones. Seals have been made which are designed to accommodate themselves to both large and small necks, but to form a good seal they must be inserted farther into the large necks than the small ones, and therefore instead of preventing variations in the distance between stem and bowl bottom they contribute to it.

It is among the objects of this invention to provide a seal for vacuum type coffee makers which effectively seals bowl necks of various inside diameters, and which always seats substantially the same distance into bowl necks regardless of the usual variation in neck diameters.

In accordance with this invention a vacuum type coffee maker, comprising a bowl having a neck down through which the stem of a funnel-like bowl extends, is provided with a resilient tubular seal that encircles the portion of the stem within the bowl neck. A portion of this seal is disposed in sealing engagement with the funnel stem, and another portion in sealing engagement with the bowl neck, whereby the annular space between the neck and stem is sealed. However, the portion of the seal engaging the stem is spaced from the inner surface of the neck, and the portion of the seal engaging the inner surface of the neck is spaced from the stem so that no part of the seal's side wall is engaged by both the neck and stem and compressed between them. Consequently, the depth at which the seal and stem seat in the neck does not depend on the diameter of the neck, as it has heretofore, and they will seat at the same depth whether the neck is larger or smaller than the average because no part of the seal can wedge between the neck and stem and prevent the latter from descending into the neck as far as it would if the neck were larger. Although downward movement of the stem into the lower bowl can be limited by engagement of the bottom of the funnel with the top of the neck, it is preferred to provide the upper end of the seal with a radial flange that extends outwardly across the top of the neck on which it rests.

The invention is illustrated in the accompanying drawing in which Fig. 1 is a fragmentary side view of a glass coffee maker of the vacuum type with the handle removed and the bowl neck, funnel stem, and seal partly broken away; Fig. 2 is a fragmentary view in vertical section showing the seal in a bowl neck which is smaller than that shown in Fig. 1; Fig. 3 is a plan view of the seal alone; and Figs. 4 and 5 are views similar to Fig. 2 showing a modification of this invention used with bowl necks of different sizes.

Referring to Fig. 1 of the drawing, the lower bowl 1 of a vacuum type glass coffee maker is provided with a neck 2 having an outwardly flaring upper end preferably connected to the body portion of the bowl by an intermediate cylindrical portion. Extending down into the bowl through its neck is the stem 3 of the upper bowl or funnel 4. The stem is considerably smaller than the neck opening, and the annular space left between the stem and neck is sealed by an airtight seal 6 mounted on the stem so that when water in the bowl is heated vapor pressure will be created therein and force water up through the stem and through coffee retained in the funnel by a suitable filter (not shown). The structure and operation described thus far is generally characteristic of coffee makers of this type.

It is a feature of this invention, however, that seal 6, which is in the form of a resilient body provided with an axial passage 7 through which stem 3 extends, has a portion that is normally spaced from the stem but is in sealing engagement with the bowl neck, while the portion of the seal that engages the stem is spaced from the inner surface of the neck. A seal of such form can always be inserted the same distance into bowl necks having the usual unavoidable variations in inside diameter encountered in manufacturing, because none of the seal's side wall becomes wedged between the stem and neck when the neck is small to prevent the seal from being inserted as far as it should be. Preferably, the upper portion of the seal engages the stem and has a wall 8 that is thin enough to avoid contact with the encircling portion of the smallest neck encountered, while the lower portion of the seal is enlarged to form an enlarged lower end of passage 7 whereby the lower wall 9 of the seal is spaced from the stem and offset outwardly to bring it into sealing engagement with the largest bowl neck encountered.

That this seal can be readily inserted in a small neck as far as in a large one is shown in Figs. 1 and 2, wherein Fig. 1 shows the seal in a relatively large neck, and Fig. 2 shows it in a relatively small one. In the larger bowl necks the lower offset wall 9 of the seal engaging the neck is substantially in its fully expanded form, but in the smaller necks, such as shown in Fig. 2, the lower portion of the seal is contracted radially inwardly until it nearly touches the stem. However, this contraction is effected without difficulty because, due to the enlarged lower end of passage 7, the inner surface of wall 9 is unsupported so that the material of the wall is not subjected to compression. Although the seal is made of resilient material, such as rubber, the wall of the seal is relatively incompressible, and it has been this resistance to compression that has prevented seals known heretofore from completely seating in relatively small bowl necks. In other words, as soon as any part of a seal came into contact with both the funnel stem and bowl neck the seal could be moved no farther into the neck, but with the seal disclosed herein no given part engages the stem and neck simultaneously and therefore it can not wedge in the neck and limit insertion of itself into the neck.

Although movement of the seal through the neck would be limited by contact of the bottom of the funnel with the top of the bowl neck, it is preferred to do this by providing the upper end of the seal with an integral radial flange 11 extending outwardly across the top of the neck on which it rests and prevents glass-to-glass contact. The top of the flange lies flush against the bottom of the funnel so that when movement of the seal into the bowl neck is stopped by its flange, the funnel stem can likewise be moved no farther. The length of the stem and the thickness of flange 11 are such in relation to the depth of the bowl that when the seal is fully seated the bottom of the stem is spaced the proper distance from the bottom of the bowl. As the only variable dimension that has to be contended with is the inside diameter of bowl necks, it will be understood that with this seal, which seats as far into small necks as larger ones, the spacing between the bottom of the stem and the bottom of a bowl remains susbtantially uniform regardless of the inner diameter of the neck. Consequently, a good seal is obtained at all times, and coffee of proper strength is assured without danger of cracking the lower bowl due to overheating.

In the modification shown in Figs. 4 and 5 the same principle is used for obtaining uniform spacing between stem and bowl bottom as in the seal just described, but the spacing between the seal 16 and funnel 17 is obtained by enlarging the upper end of the stem on which the upper portion of the seal is mounted so that its lower portion will extend downwardly below the enlargement and be free of the stem. The wall of the seal projecting below the stem enlargement is thickened in the general form of a bead 18 in order to cause it to extend outwardly beyond the stem-engaging wall 19 of the seal and into sealing engagement with the bowl neck 21, as shown in Fig. 4. Movement of the seal into the neck is limited, regardless of the size of the neck, by an integral radial flange 22 at the upper end of the seal.

When this seal is inserted in a smaller bowl neck, as shown in Fig. 5, the bead portion of the seal is contracted and forced inwardly toward the smaller portion of the funnel stem directly below its enlargement. As the inner surface of the lower end of the seal is unsupported, the bead portion does not wedge between the stem and neck and prevent the seal from being inserted in the latter far enough to permit flange 22 to engage the top of the neck. Consequently, this seal seats a uniform distance into bowl necks having the usual variation in inside diameter.

According to the provision of the patent statutes, we have explained the principle and mode of operation of our invention and have illustrated and described what we now consider to represent its best embodiment. However, we desire to have it understood that, within the scope of the appended claims, the invention may be practiced otherwise than as specifically illustrated and described.

We claim:

1. A coffee maker comprising a bowl having a neck, a funnel with a stem extending downwardly into said bowl through said neck, the upper portion of the stem being enlarged, and a resilient tubular seal encircling said enlarged portion of the stem in sealing engagement therewith and substantially out of contact with said neck and extending downwardly beyond said enlarged portion and into sealing engagement with said neck, said downwardly extending portion of the seal being normally spaced from said stem, and being adapted to be deformed inwardly under said enlarged portion of the stem.

2. A coffee maker comprising a bowl having a neck, a funnel with a stem extending downwardly into said bowl through said neck, the upper portion of the stem being enlarged, and a resilient tubular seal encircling said enlarged portion of the stem in sealing engagement therewith and substantially out of contact with said neck, said seal having a thickened portion extending downwardly beyond said enlarged portion and into sealing engagement with said neck, the upper end of said seal being encircled by a radial flange extending outwardly across the top of said neck in contact therewith.

3. A coffee maker seal or connecting in sealing relation the depending stem of a funnel bowl and the upstanding neck of a lower bowl, said seal being adapted to encircle said stem within said neck and engage the bottom of said funnel bowl, said seal having a resilient annular portion for sealingly engaging only said stem and another resilient annular portion for sealingly engaging only said neck whereby downward movement of said seal and stem in said neck is unrestricted by variations in spacing between neck and stem, the upper end of the seal having a flange projecting laterally across the top of said neck, and said flange having a substantially flat lower face for engaging said neck top to limit said downward movement of the stem in the neck and thereby space the stem a predetermined distance from the bottom of the lower bowl regardless of variations in internal neck and external stem diameters.

4. A coffee maker seal for connecting in sealing relation the depending stem of a funnel bowl and the upstanding neck of a lower bowl, said seal being adapted to encircle said stem within said neck and engage the bottom of said funnel bowl, an annular portion of the side wall of said seal being in sealing engagement with said stem and substantially out of contact with said neck, the remaining annular portion of the side wall of the seal being normally spaced from said stem for engaging and sealing said neck whereby no part of the seal's side wall is engaged by both the stem and neck and compressed between them to restrict downward movement of the seal and stem into the neck, the outer diameter of said stem-engaging portion of the seal being less than the outer diameter of said neck-engaging portion of the seal, the upper end of the seal having a flange projecting laterally across the top of said neck, and said flange having a substantially flat lower face for engaging said neck top to limit said downward movement of the stem in the neck and thereby space the stem a predetermined distance from the bottom of the lower bowl regardless of variations in internal neck and external stem diameters.

5. A coffee maker seal for connecting in sealing relation the depending stem of a funnel bowl and the upstanding neck of a lower bowl, said seal being adapted to encircle said stem within said neck and engage the bottom of said funnel bowl, the upper portion of the side wall of said seal being in sealing engagement with said stem and substantially out of contact with said neck, and the lower portion of the seal being offset outwardly relative to said upper portion to space it from said stem and bring it into sealing engagement with said neck whereby downward movement of said seal and stem in said neck is unrestricted by variations in spacing between neck and stem, the upper end of the seal having a flange projecting laterally across the top of said neck, and said flange having a substantially flat lower face for engaging said neck top to limit said downward movement of the stem in the neck and thereby space the stem a predetermined distance from the bottom of the lower bowl regardless of variations in internal neck and external stem diameters.

6. A coffee maker seal for connecting in sealing relation the depending stem of a funnel bowl and the upstanding neck of a lower bowl, said seal being adapted to encircle said stem within said neck and engage the bottom of said funnel bowl, an annular portion of the side wall of said seal being in sealing engagement with said stem and substantially out of contact with said neck, the remaining annular portion of the side wall of the seal being normally spaced from said stem for engaging and sealing said neck whereby no part of the seal's side wall is engaged by both the stem and neck and compressed between them to restrict downward movement of the seal and stem into the neck, the outer diameter of said stem-engaging portion of the seal being less than the outer diameter of said neck-engaging portion of the seal, the upper end of the seal having a flange projecting laterally across the top of said neck, and said flange having a substantially flat lower face for engaging said neck top to limit said downward movement of the stem in the neck and thereby space the stem a predetermined distance from the bottom of the lower bowl regardless of variations in internal neck and external stem diameters, said side wall being of substantially uniform thickness throughout its length.

RAYMOND W. KELL.
CHARLES D. BARTH.